Aug. 11, 1953     B. J. KOSMOSKI ET AL     2,648,133
LIQUID DEPTH AND TANK DIAMETER MEASURING DEVICE
Filed April 25, 1952
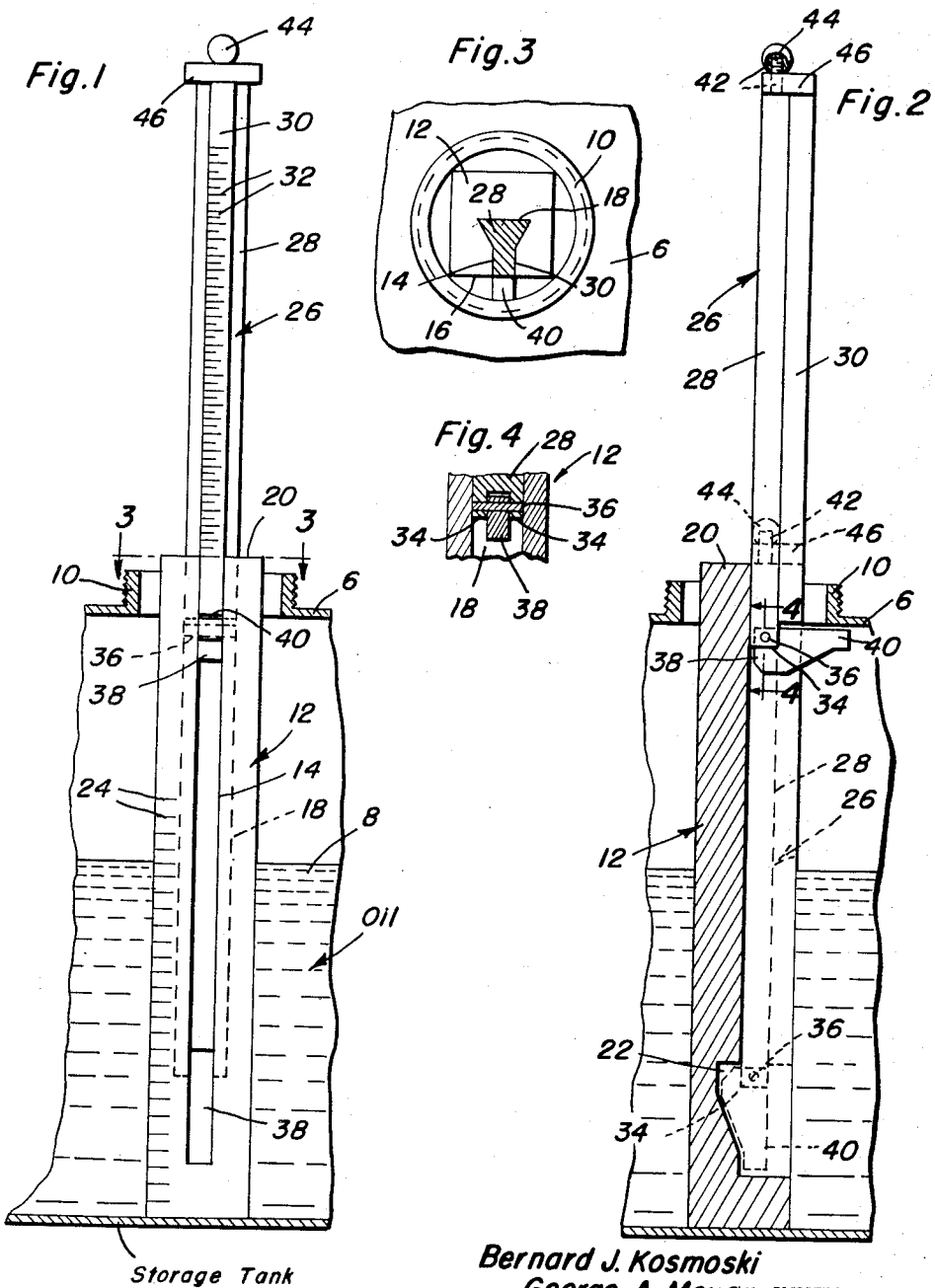
Bernard J. Kosmoski
George A. Meyer INVENTORS.
BY *[signatures]*
Attorneys Patented Aug. 11, 1953

2,648,133

UNITED STATES PATENT OFFICE 2,648,133

LIQUID DEPTH AND TANK DIAMETER MEASURING DEVICE

Bernard J. Kosmoski and George A. Meyer, Jersey City, N. J.

Application April 25, 1952, Serial No. 284,374

5 Claims. (Cl. 33—126.7)

The present invention relates to liquid depth gauges, generally speaking, and has more particular reference to a novel structural device having a combination of facilities making it possible to satisfactorily measure the diameter of a storage tank and the depth of liquid contained in said tank and making it readily possible to readily utilize the data thus obtained to arrive at a calculation giving the correct amount, in gallons, of the liquid contained in the tank.

It is common knowledge in the oil industry that it is usual practice to employ a calibrated measuring stick, one which is graduated in inches, in measuring oil in an underground storage tank. This is to say, when the measuring stick is passed through the filler neck or opening and is forced into the oil and rested on the tank bottom and thereafter removed the oil mark on the graduations gives the amount of oil in the tank, in inches, of course. However, unless the diameter of the tank is ascertained through the medium of an inside tank calibrating instrument, the inch measurements cannot be readily translated into gallons. It is therefore the object of the instant invention to provide a single instrumentality which functions as a liquid depth gauge or measuring stick and which, in addition, provides means for determining the diameter of the tank, whereby the readings may be satisfactorily utilized and, in conjunction with a handy chart may be translated into gallons for desired and advantageous use by the gager.

Many a time the gager desires to use gallons in preparing his capacity work sheet or other checking record. Although charts are handy for translating inch measurements into gallons, a reliable and accurate single instrumentality for furnishing the liquid depth and tank diameter factors is not currently available.

In carrying out the underlying principles of the inventive concept a handy and simply constructed instrumentality or device has been devised, the same being an improvement on similarly constructed and performing measuring instruments and being characterized, broadly speaking, by a calibrated measuring stick which descends into the tank by way of a top opening and rests upon the bottom of the tank, said stick having a lengthwise bore and said bore accommodating an extensible and retractable graduated sliding rod or rule. The stick functions as a sheath for the rod and the latter is provided with a folding type hingedly mounted foot or abutment which may be brought to bear against the interior of the tank to thus aptly interrelate the graduations on the depth measuring stick and complemental rod to utilize the combined readings for gallon computation requirements.

More specifically a longitudinally bored measuring stick for depth measurement is provided and the extensible and retractable rod is slidable in the bore. The liquid level or depth measurement is taken by way of inch graduations on the scale on the measuring stick. The sliding rod has additional inch measurements and these coordinate with the upper end of the stick which latter then serves as an index and the stick and rod combinedly provide the essential inch factors in making the desired translation into gallons. The folding foot on the rod is normally contained in a clearance pocket provided therefor at the lower end of the bore in the measuring stick, making it possible to conveniently collapse the rod and foot into the sheath forming measuring stick and to insert the two, as a single instrumentality, through the hole in the storage tank and to thereafter withdraw the rod from the measuring stick to bring the stop forming foot into play.

Other objects, features and advantages will become more readily apparent from the following description and the accompanying sheet of drawings.

In the sheet of drawings wherein like numerals are employed to designate like parts throughout the views:

Figure 1 is a fragmentary sectional view of an oil or similarly functioning storage tank with the liquid depth and tank diameter measuring device arranged therein and set to take the depth and diameter measurements;

Figure 2 is a view at right angles to Figure 1 with the measuring stick appearing in section and the rod in elevation with the latter shown in its respective extended and retracted positions in full and dotted lines respectively;

Figure 3 is a fragmentary view taken on the horizontal line 3—3 of Figure 1 looking in the direction of the arrows; and Figure 4 is a fragmentary sectional view taken on the vertical line 4—4 of Figure 2 looking in the direction of the arrows.

Referring now to the drawings by reference characters, the underground cylindrical storage tank is denoted by the numeral 6 and the oil or equivalent liquid level is denoted at 8. The filler neck 10 which provides the opening means in the top is shown with the closing cap (not shown) removed.

The depth measuring and diameter measuring combination device or instrumentality is characterized essentially, as before revealed, by two components. The principal one is conveniently identified as a depth measuring stick 12 and this is of any appropriate light-weight material suitable for use when immersed in oil. The stick may be rectangular in cross-section as shown, for example, in Figure 3. It is provided with a longitudinally extending bore. Actually the bore takes the form of a lengthwise slot 14 which opens through what may be called the face 16. The slot also communicates with a dove-tailed shaped portion 18 which constitutes a keyway. The so-called bore terminates short of the bottom of the stick as shown in Figures 1 and 2 and opens at its opposite end through the very top 20 of the stick which top serves as an index in a manner to be hereinafter described. The lower portion of the bore is counter-bored to provide a laterally offset clearance pocket 22, as best shown in Figure 2. Suitable graduations or inch marks are provided as at 24 to, in turn, provide a depth measuring scale.

The extensible and retractable sliding rod or rule complement is denoted by the numeral 26 and it has a dove-tailed shaped portion 28 providing a key which is slidable in the keyway 18 and has a rib portion 30 which slides in the slot 14. The rib portion is provided with inch graduations 32 providing a second scale and these graduations cooperate with the relatively fixed index 20, as shown best in Figure 1. The lower end of the rod is bifurcated and the furcations are denoted at 34—34. These furcations accommodate a pivot pin 36 which serves to attach and hinge the abutment or foot 38 in place. The foot is such in shape that it swings to a right angular position as shown in full lines of Figure 2 at which time the tip end 40 underlies the opening means and functions as a stop when brought into contact or engagement with the interior of the wall of the tank 6. The normal position of the foot is in longitudinal alignment with the slide rule, as shown for example in phantom lines in Figure 2. The recess or pocket means 22 serves to permit the foot to fold therein in the manner illustrated. Normally then the two instruments 12 and 26 are collapsed or telescoped together to provide a convenient instrumentality which may be readily inserted through the opening means in the tank. There is a screw-threaded stud 42 on the upper end of the rod and this serves to accommodate a ball-shaped nut or head 44 which serves to hold in place a block-like cleat 46. The latter overhangs the marginal edge portion of the rod and provides stop shoulders engaging the upper end of the bore in the measuring stick.

In use, the instrumentality in its collapsed or folded form, appearing in full and dotted lines in the tank in Figure 2, is lowered into the tank with the stick 12 resting on the bottom of the tank. Then, the sliding rod or rule 26 is pulled up and this causes the tiltable automatically functioning foot 38 to swing out of the pocket means and to take a horizontal position at right angles to the longitudinal axis of the slide rule. Then, the latter is pulled up to the top of the tank and this can, of course, be felt when the foot comes into contact with the tank. The rod is calibrated to read in inches from the bottom of the stick 12 and therefore coincides with the stick. When the rod is pulled up about one-half inch it causes the foot to move into its horizontal position and the foot is then about twenty-six inches from the bottom of the tank and a reading is taken on the rod as is obvious. With the removal of the stick from the tank it is possible to get the reading in inches with respect to the oil depth and this and the diameter of the tank being already known it is an easy matter to refer to suitable charts already in use and to thus translate the given data into gallons of oil contained in the tank. Of course, to remove the stick from the tank it is necessary to drop the rod 26 down in the slot means in a clearly obvious manner.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. An instrument for measuring the diameter of a storage tank and simultaneously measuring the depth of liquid in said tank and thus ascertaining the amount of liquid contained in said tank comprising an insertable and removable depth measuring stick having depth denoting graduations, a complemental rod slidably connected with said stick, and a projectible and retractable tank engaging abutment carried by said rod, said abutment being a block-member hingedly mounted on said rod, said stick constituting a sheath for the rod and having a laterally offset clearance pocket into which said block-member is foldable to an out-of-the-way position.

2. An instrument for measuring the diameter of a storage tank and simultaneously measuring the depth of liquid contained in said tank comprising a depth measuring stick insertable through opening means in the tank so that the bottom of the stick may rest upon the bottom of the tank, said stick having a depth measuring scale and having a lengthwise bore, a sliding rule telescopically slidable in said bore, said sliding rule having a scale whose graduations are cooperable with an end of said stick, said stick having an accommodation pocket in communication with said bore, and an abutment foot hingedly mounted on said sliding rule and foldable to an out-of-the-way position in said pocket.

3. The structure specified in claim 2 wherein said bore terminates upwardly of the lower end of the stick and opens through the upper end of the stick, said bore including a slot and said slot opening through one face of said stick.

4. The structure specified in claim 2 wherein said bore terminates upwardly of the lower end of the stick and opens through the upper end of the stick, said bore including a slot and said slot opening through one face of said stick, and a stop block mounted on the upper end of said sliding rule and adapted to bridge the upper end of the bore and to function as a stop limiting the downward descent of the sliding rule in said bore.

5. An instrument for measuring the diameter of a storage tank and also the depth of liquid contained in said tank comprising, in combination, a depth measuring stick adapted to be inserted through an opening means in the storage tank so that the lower end of the stick may then rest on the bottom of the tank, said stick having a lengthwise slot opening through one side and having a complemental registering bore which is dove-tailed in cross-section, the upper end of said bore opening through the upper end of said stick and the lower end of said bore terminating in a laterally offset clearance pocket, a sliding rule having a rib portion slidable in said slot and dove-tail key portion keyed in said bore, a stop forming foot hingedly attached to the lower end of said sliding rule and foldable into said clearance pocket, and detachable stop means mounted on the upper end of said sliding rule and engageable with the upper end of said measuring stick.

BERNARD J. KOSMOSKI.
GEORGE A. MEYER.

References Cited in the file of this patent

UNITED STATES PATENTS

| Number | Name | Date |
| --- | --- | --- |
| 206,259 | Prime | July 23, 1878 |
| 2,547,002 | Hanson | Apr. 3, 1951 |